United States Patent
Kanawa (10) Patent No.: US 8,214,403 B2
(45) Date of Patent: Jul. 3, 2012

(54) STRUCTURED DOCUMENT MANAGEMENT DEVICE AND METHOD

(75) Inventor: Takuya Kanawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 262 days.

(21) Appl. No.: 12/560,617

(22) Filed: Sep. 16, 2009

(65) Prior Publication Data

US 2010/0250610 A1    Sep. 30, 2010

(30) Foreign Application Priority Data

Mar. 24, 2009    (JP) .................................. 2009-071661

(51) Int. Cl.
*G06F 17/30* (2006.01)
(52) U.S. Cl. ....................................... 707/796; 707/803
(58) Field of Classification Search .................. 707/796, 707/803
See application file for complete search history.

(56) References Cited

U.S. PATENT DOCUMENTS

| | | | |
|---|---|---|---|
| 6,681,223 B1 * | 1/2004 | Sundaresan ........................... | 1/1 |
| 2006/0149796 A1 * | 7/2006 | Aalmink ............................... | 707/204 |
| 2008/0240619 A1 | 10/2008 | Kanawa | |

FOREIGN PATENT DOCUMENTS

| | | |
|---|---|---|
| JP | 08-288861 | 11/1996 |
| JP | 2006-172363 | 6/2006 |

* cited by examiner

*Primary Examiner* — Charles Kim
*Assistant Examiner* — Alan Graham
(74) *Attorney, Agent, or Firm* — Turosy & Watson, LLP (57) ABSTRACT

An index creating unit divides text information into words and creates index information associated with schema identification information and identification information for each of the words divided. When the number of pieces of the index information stored in a file format exceeds a threshold, an index analyzing unit analyzes a distribution of a schema identification information group and an identification information group. When an analysis shows that more than a predetermined number of the schema identification information substantially match the schema identification information stored in a first rule storage unit, a first compressing unit compresses the schema identification information group using group identification information and in-group identification information stored in the first rule storage unit. A second compressing unit compresses at least one of the schema identification information group and the identification information group using a compression rule stored in a second rule storage unit and determined in accordance with a analysis of the index information.

5 Claims, 12 Drawing Sheets

```
<PATENT ID="3">
   <TITLE>STRUCTURED DOCUMENT SEARCHING DEVICE</TITLE>
   <INVENTOR LIST>
      <INVENTOR ID="123">TANAKA</INVENTOR>
      <INVENTOR ID="456">SUZUKI</INVENTOR>
   </INVENTOR LIST>
</PATENT>
```

| WORD | Tan | XML | DOCUMENT | CHARGE | ... |
|---|---|---|---|---|---|
| FILE NUMBER | 24 | 37 | 79 | 1543 | ... |

|  | INDEX INFOR- MATION 1 | INDEX INFOR- MATION 2 | INDEX INFOR- MATION 3 | INDEX INFOR- MATION 4 | INDEX INFOR- MATION 5 | INDEX INFOR- MATION 6 | ... |
|---|---|---|---|---|---|---|---|
| DOCUMENT IDENTIFI- CATION INFORMATION | 90 | 100 | 100 | 115 | 125 | 125 | ... |
| SCHEMA IDENTIFI- CATION INFORMATION | 010 | 010 | 004 | 004 | 005 | 010 | ... |
| ELEMENT IDENTIFI- CATION INFORMATION | 15 | 10 | 20 | 8 | 10 | 25 | ... |
| OCCURRENCE POSITION INFORMATION | 24 | 10 | 20 | 18 | 20 | 30 | ... |

FIG.9

| GROUP IDENTIFICATION INFORMATION \ IN-GROUP IDENTIFICATION INFORMATION | 0 | 1 | 2 | 3 | 4 | 5 | 6 | 7 | 8 | ... |
|---|---|---|---|---|---|---|---|---|---|---|
| A | 001 | 100 | 201 | 301 | 103 | 104 | 105 | 106 | 107 | ... |
| B | 002 | 401 | 402 | 403 | | | | | | ... |
| C | 404 | 405 | 406 | | | | | | | ... |
| : | : | : | : | : | : | : | : | : | : | ... |

FIG.10

| COMPRESSION RULE | APPLICABLE CONDITION | APPLICATION METHOD |
|---|---|---|
| RULE 1 (CONSOLIDATION OF DOCUMENT IDENTIFICATION INFORMATION AND ELEMENT IDENTIFICATION INFORMATION) | $\alpha$ % OR MORE OF VALUES ARE SAME | CONSOLIDATE SAME VALUES OF DOCUMENT IDENTIFICATION INFORMATION AND ELEMENT IDENTIFICATION INFORMATION |
| RULE 2 (CONSOLIDATION OF DOCUMENT IDENTIFICATION INFORMATION) | $\beta$ % OR MORE OF VALUES ARE SAME | CONSOLIDATE SAME VALUES OF DOCUMENT IDENTIFICATION INFORMATION |
| RULE 3 (CONSOLIDATION OF ELEMENT IDENTIFICATION INFORMATION) | $\gamma$ % OR MORE OF VALUES ARE SAME | CONSOLIDATE SAME VALUES OF ELEMENT IDENTIFICATION INFORMATION |
| RULE 4 (PATTERNING) | x OR MORE SAME PATTERNS | REPLACE PATTERN WITH PATTERN INFORMATION |
| RULE 5 (DIFFERENTIAL COMPRESSION) | WHEN INDEX INFORMATION IS COMPRESSED | CALCULATE DIFFERENCE FROM PRIOR VALUE |
| : | : | : |

FIG.11A

| SCHEMA IDENTIFICATION INFORMATION | 100 | 201 | 301 | 106 | 100 | 401 | 402 |
|---|---|---|---|---|---|---|---|

FIG.11B

| SCHEMA IDENTIFICATION INFORMATION | A1 | A2 | A3 | A7 | A1 | B1 | B2 |
|---|---|---|---|---|---|---|---|

FIG.12A

| DOCUMENT IDENTIFICATION INFORMATION | 1 | 1 | 1 | 1 | 2 | 2 | 2 | 2 |
|---|---|---|---|---|---|---|---|---|
| SCHEMA IDENTIFICATION INFORMATION | A2 | A3 | A2 | A3 | A2 | A3 | A2 | A3 |
| ELEMENT IDENTIFICATION INFORMATION | 2 | 2 | 2 | 2 | 2 | 2 | 2 | 2 |
| OCCURRENCE POSITION INFORMATION | 3 | 4 | 3 | 4 | 3 | 4 | 3 | 4 |

FIG.12B

| DOCUMENT IDENTIFICATION INFORMATION | 1 | 2 | | | | | | |
|---|---|---|---|---|---|---|---|---|
| SCHEMA IDENTIFICATION INFORMATION | A2 | A3 | A2 | A3 | A2 | A3 | A2 | A3 |
| ELEMENT IDENTIFICATION INFORMATION | 2 | | | | | | | |
| OCCURRENCE POSITION INFORMATION | 3 | 4 | 3 | 4 | 3 | 4 | 3 | 4 |

FIG.13A

| |
|---|
| INDEX INFORMATION 1<br>(DOCUMENT IDENTIFICATION INFORMATION 1, SCHEMA IDENTIFICATION INFORMATION 1, ELEMENT IDENTIFICATION INFORMATION 1, OCCURRENCE POSITION INFORMATION 1) |
| INDEX INFORMATION 2<br>(DOCUMENT IDENTIFICATION INFORMATION 2, SCHEMA IDENTIFICATION INFORMATION 2, ELEMENT IDENTIFICATION INFORMATION 2, OCCURRENCE POSITION INFORMATION 2) |
| INDEX INFORMATION 3<br>(DOCUMENT IDENTIFICATION INFORMATION 3, SCHEMA IDENTIFICATION INFORMATION 3, ELEMENT IDENTIFICATION INFORMATION 3, OCCURRENCE POSITION INFORMATION 3) |
| INDEX INFORMATION 4<br>(DOCUMENT IDENTIFICATION INFORMATION 4, SCHEMA IDENTIFICATION INFORMATION 4, ELEMENT IDENTIFICATION INFORMATION 4, OCCURRENCE POSITION INFORMATION 4) |
| : |
| INDEX INFORMATION n<br>(DOCUMENT IDENTIFICATION INFORMATION n, SCHEMA IDENTIFICATION INFORMATION n, ELEMENT IDENTIFICATION INFORMATION n, OCCURRENCE POSITION INFORMATION n) |

FIG.13B

| |
|---|
| COMPRESSED DOCUMENT IDENTIFICATION INFORMATION<br>(COMPRESSED DOCUMENT IDENTIFICATION INFORMATION PIECES (1 TO n)) |
| COMPRESSED SCHEMA IDENTIFICATION INFORMATION<br>(COMPRESSED SCHEMA IDENTIFICATION INFORMATION PIECES (1 TO n)) |
| COMPRESSED ELEMENT IDENTIFICATION INFORMATION<br>(COMPRESSED ELEMENT IDENTIFICATION INFORMATION PIECES (1 TO n)) |
| COMPRESSED OCCURRENCE POSITION INFORMATION<br>(COMPRESSED OCCURRENCE POSITION INFORMATION PIECES (1 TO n)) |

| DOCUMENT IDENTIFICATION INFORMATION | 1 | 1 | 1 | 1 | 2 | 2 | 2 | 2 |
|---|---|---|---|---|---|---|---|---|
| SCHEMA IDENTIFICATION INFORMATION | 201 | 301 | 201 | 301 | 201 | 301 | 201 | 301 |
| ELEMENT IDENTIFICATION INFORMATION | 2 | 8 | 10 | 3 | 20 | 6 | 1 | 7 |
| OCCURRENCE POSITION INFORMATION | 3 | 4 | 3 | 4 | 3 | 4 | 3 | 4 |

FIG.15B

| DOCUMENT IDENTIFICATION INFORMATION | 1 | 1 | 1 | 1 | 2 | 2 | 2 | 2 |
|---|---|---|---|---|---|---|---|---|
| SCHEMA IDENTIFICATION INFORMATION | A2 | A3 | A2 | A3 | A2 | A3 | A2 | A3 |
| ELEMENT IDENTIFICATION INFORMATION | 2 | 8 | 10 | 3 | 20 | 6 | 1 | 7 |
| OCCURRENCE POSITION INFORMATION | 3 | 4 | 3 | 4 | 3 | 4 | 3 | 4 |

FIG.15C

| DOCUMENT IDENTIFICATION INFORMATION | 1 | 2 | | | | | | |
|---|---|---|---|---|---|---|---|---|
| SCHEMA IDENTIFICATION INFORMATION | A2 | A3 | A2 | A3 | A2 | A3 | A2 | A3 |
| ELEMENT IDENTIFICATION INFORMATION | 2 | 8 | 10 | 3 | 20 | 6 | 1 | 7 |
| OCCURRENCE POSITION INFORMATION | 3 | 4 | 3 | 4 | 3 | 4 | 3 | 4 |

FIG.16A

| DOCUMENT IDENTIFICATION INFORMATION | 1 | 1 | 1 | 1 | 2 | 2 | 2 | 2 |
|---|---|---|---|---|---|---|---|---|
| SCHEMA IDENTIFICATION INFORMATION | 501 | 502 | 503 | 501 | 502 | 503 | 501 | 502 |
| ELEMENT IDENTIFICATION INFORMATION | 1 | 1 | 1 | 2 | 2 | 2 | 3 | 3 |
| OCCURRENCE POSITION INFORMATION | 0 | 10 | 23 | 0 | 8 | 3 | 14 | 0 |

FIG.16B

| DOCUMENT IDENTIFICATION INFORMATION | 1 | 2 | | | | | | |
|---|---|---|---|---|---|---|---|---|
| SCHEMA IDENTIFICATION INFORMATION | 501 | 502 | 503 | 501 | 502 | 503 | 501 | 502 |
| ELEMENT IDENTIFICATION INFORMATION | 1 | 2 | 3 | | | | | |
| OCCURRENCE POSITION INFORMATION | 0 | 10 | 23 | 20 | 25 | 3 | 14 | 10 |

FIG.16C

| DOCUMENT IDENTIFICATION INFORMATION | 1 | 1 | | | | | | | | |
|---|---|---|---|---|---|---|---|---|---|---|
| SCHEMA IDENTIFICATION INFORMATION | 501 | 502 | 503 | 0 | 1 | 2 | 0 | 1 | 2 | 0 | 1 |
| ELEMENT IDENTIFICATION INFORMATION | 1 | 1 | 1 | | | | | | | |
| OCCURRENCE POSITION INFORMATION | 0 | 10 | 23 | 20 | 25 | 3 | 14 | 10 | | |

FIG.17A

| DOCUMENT IDENTIFICATION INFORMATION | 1 | 1 | 1 | 1 | 2 | 2 | 2 | 2 |
|---|---|---|---|---|---|---|---|---|
| SCHEMA IDENTIFICATION INFORMATION | 501 | 502 | 503 | 504 | 502 | 503 | 501 | 505 |
| ELEMENT IDENTIFICATION INFORMATION | 1 | 1 | 1 | 2 | 2 | 2 | 3 | 3 |
| OCCURRENCE POSITION INFORMATION | 0 | 10 | 23 | 0 | 8 | 3 | 14 | 0 |

FIG.17B

| DOCUMENT IDENTIFICATION INFORMATION | 1 | 2 | | | | | | |
|---|---|---|---|---|---|---|---|---|
| SCHEMA IDENTIFICATION INFORMATION | 501 | 502 | 503 | 504 | 502 | 503 | 501 | 505 |
| ELEMENT IDENTIFICATION INFORMATION | 1 | 2 | 3 | | | | | |
| OCCURRENCE POSITION INFORMATION | 0 | 10 | 23 | 20 | 25 | 3 | 14 | 10 |

FIG.17C

| DOCUMENT IDENTIFICATION INFORMATION | 1 | 1 | | | | | | |
|---|---|---|---|---|---|---|---|---|
| SCHEMA IDENTIFICATION INFORMATION | 501 | 1 | 1 | 1 | 2 | 1 | 2 | 4 |
| ELEMENT IDENTIFICATION INFORMATION | 1 | 1 | 1 | | | | | |
| OCCURRENCE POSITION INFORMATION | 0 | 10 | 13 | 3 | 5 | 22 | 11 | 4 |

STRUCTURED DOCUMENT MANAGEMENT DEVICE AND METHOD

CROSS-REFERENCE TO RELATED APPLICATIONS

This application is based upon and claims the benefit of priority from the prior Japanese Patent Application No. 2009-071661, filed on Mar. 24, 2009; the entire contents of which are incorporated herein by reference.

BACKGROUND OF THE INVENTION

1. Field of the Invention

The present invention relates to a structured document management device and a method.

2. Description of the Related Art

In recent years, various data are managed in a structured document format, such as XML (Extensible Markup Language). There are growing demands for managing various data in the structured document format, which have conventionally been managed by other means, such as formulaic numerical data managed with relational databases, and text data managed with full-text search engines.

Thus, sophisticated queries that designate keywords and structured conditions are being used for structured documents managed in structured document databases, such as XQuery (an XML Query Language) standardized by W3C (World Wide Web Consortium). With this, an increase in search speed is also demanded.

In order to increase the search speed, there is a method that includes dividing a text, which is to be registered in a structured document database, on a keyword basis; associating the divided keyword with document identification information of the structured document to be registered in the structured document database, structure information that indicates the structure of the structured document, and occurrence position information of the keyword in the structured document; and indexing in an inverted file format.

In an index managing system that uses the inverted file, the size of the index generally becomes significantly large. JP-A 2006-172363 (KOKAI) discloses preparing plural compression methods in advance and compressing an index using a compression method that corresponds to a time when registering the index in the inverted file format.

Because time is used as a key to determine the compression method in the art disclosed in JP-A 2006-172363 (KOKAI), the optimal compression method is not always selected.

Generally, a structured document, which is to be registered in a structured document databases, has pieces of data of similar structures that are to be sequentially registered. However, it is often the case that the structure itself of the structure document does not have regularity or relevance. Thus, a high compression rate of the index structure information cannot be expected even when plural compression methods are separately used.

SUMMARY OF THE INVENTION

According to one aspect of the present invention, a structured document management device includes a communication unit configured to receive a structured document from a client device via a network; a document analyzing unit configured to analyze a structure of the structured document and extract text information of the structured document; a schema creating unit configured to create first schema information that indicates a structural characteristic of the structured document; a schema storage unit configured to store second schema information created in advance by the schema creating unit and schema identification information for identifying the second schema information in association with each other; a search unit configured to search the schema storage unit for the second schema information that substantially matches the first schema information; an adding unit configured to add, to the structured document, the schema identification information for identifying the second schema information searched by the search unit and identification information for identifying the structured document; an index creating unit configured to divide the text information into words and create index information associated with the schema identification information and the identification information for each of the words divided; an index storage unit configured to store the index information in a file format; an index analyzing unit configured to analyze, when a number of pieces of the index information stored in the file format exceeds a threshold, a distribution of a schema identification information group that includes pieces of the schema identification information equal in number to the pieces of the index information and an identification information group that includes pieces of the identification information equal in number to the pieces of the index information; a first rule storage unit configured to store the schema identification information, group identification information provided for uniquely identifying a group to which the schema identification information belongs and used in compression of the schema identification information group, and in-group identification information provided for uniquely identifying the schema identification information in the group and used in compression of the schema identification information group, in association with each other; a second rule storage unit configured to store a plurality of compression rules; a first compressing unit configure to compress, when a result of distribution analysis of the schema identification information group shows that more than a predetermined number of pieces of the schema identification information match pieces of the schema identification information stored in the first rule storage unit, the schema identification information group using the group identification information and the in-group identification information; and a second compressing unit configured to compress at least one of the schema identification information group and the identification information group using the compression rule stored in the second rule storage unit and determined in accordance with a result of distribution analysis of the index information.

According to another aspect of the present invention, a structured document management method includes receiving a structured document from a client device via a network; analyzing a structure of the structured document and extracting text information of the structured document; creating first schema information that indicates a structural characteristic of the structured document; searching a schema storage unit that stores second schema information created in advance and schema identification information for identifying the second schema information in association with each other for the second schema information that substantially matches the first schema information; adding, to the structured document, the schema identification information for identifying the searched second schema information and identification information for identifying the structured document; dividing the text information into words; creating index information associated with the schema identification information and the identification information for each of the words divided; storing the created index information in a file format in the index storage unit; analyzing, when a number of pieces of the index information stored in the file format exceeds a threshold, a distribution of a schema identification information group that includes pieces of the schema identification information equal in number to the pieces of the index information and an identification information group that includes pieces of the identification information equal in number to the pieces of the index information; compressing, when a result of distribution analysis of the schema identification information group shows that more than a predetermined number of pieces of the schema identification information match pieces of the schema identification information stored in a first rule storage unit having the schema identification information, group identification information provided for uniquely identifying a group to which the schema identification information belongs and used in compression of the schema identification information group, and in-group identification information provided for uniquely identifying the schema identification information in the group and used in compression of the schema identification information group stored in association with each other, the schema identification information group using the group identification information and the in-group identification information; and compressing at least one of the schema identification information group and the identification information group using a compression rule stored in a second rule storage unit that stores a plurality of compression rules and determined in accordance with a result of distribution analysis of the index information.

DETAILED DESCRIPTION OF THE INVENTION

Hereinafter, with reference to the accompanying drawings, a structured document management device and a method according to an embodiment of the present invention will be described in detail.

First a description is made about the configuration of a structured document management device according to this embodiment.

Figure 1:
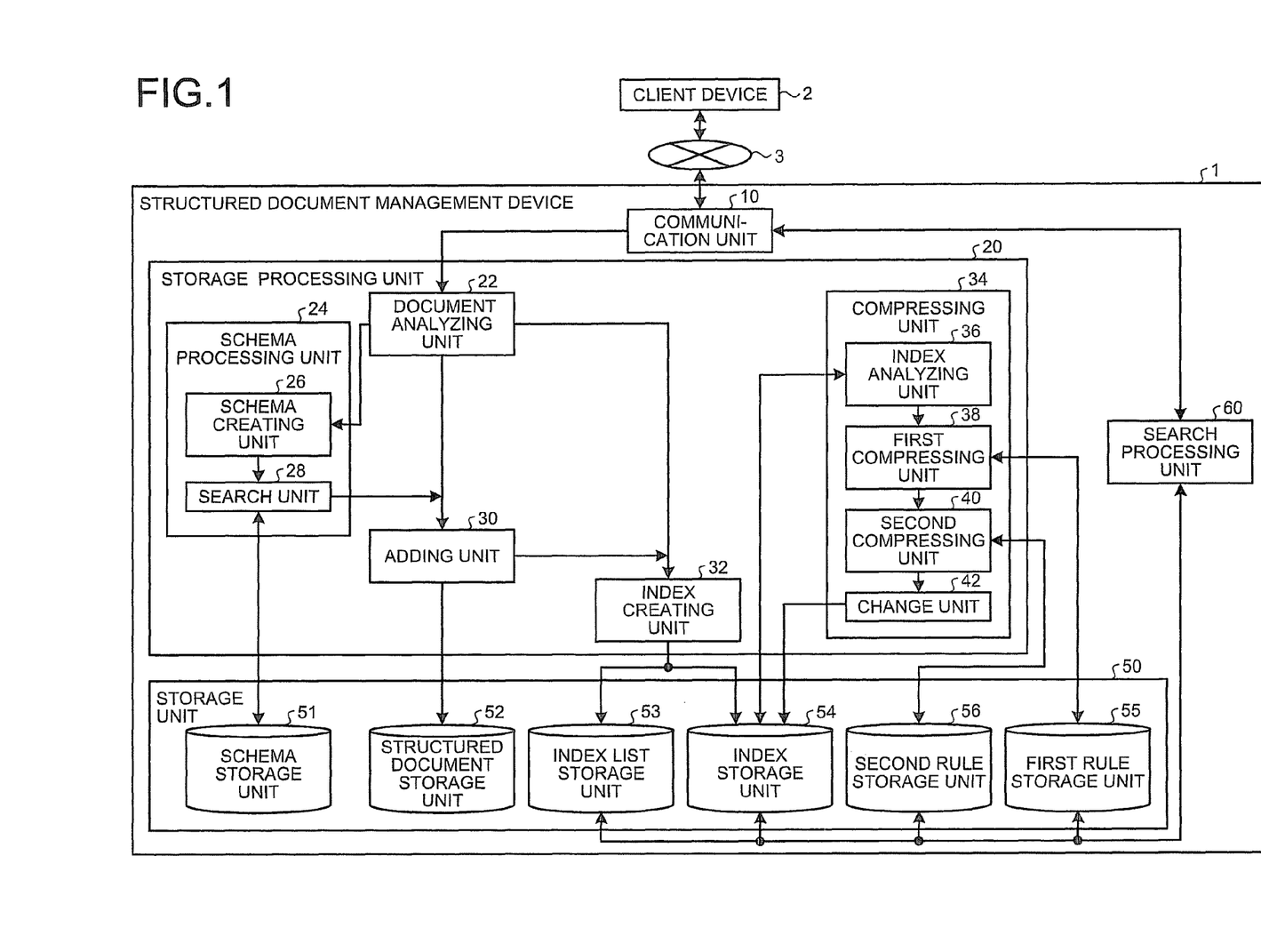
FIG. 1 is a block diagram illustrating an example configuration of a structured document management device according to a present embodiment.

A structured document management device 1 illustrated in FIG. 1 is configured to manage structured documents having hierarchized logic structures and is connected to a client device 2 via a network 3. In this embodiment, the client device 2 requests the structured document management device 1 to store a structured document and the structured document management device 1 stores the structured document. The network 3 may be any of a wired network, wireless network, LAN (Local Area Network) and public communication line.

As illustrated in FIG. 1, the structured document management device 1 includes a communication unit 10, a storage processing unit 20, a storage unit 50 and a search processing unit 60.

The communication unit 10 is configured to perform data transmission and reception with the client device 2 and receive the structured document and a search request of the structured document sent from the client device 2.

Figure 2:
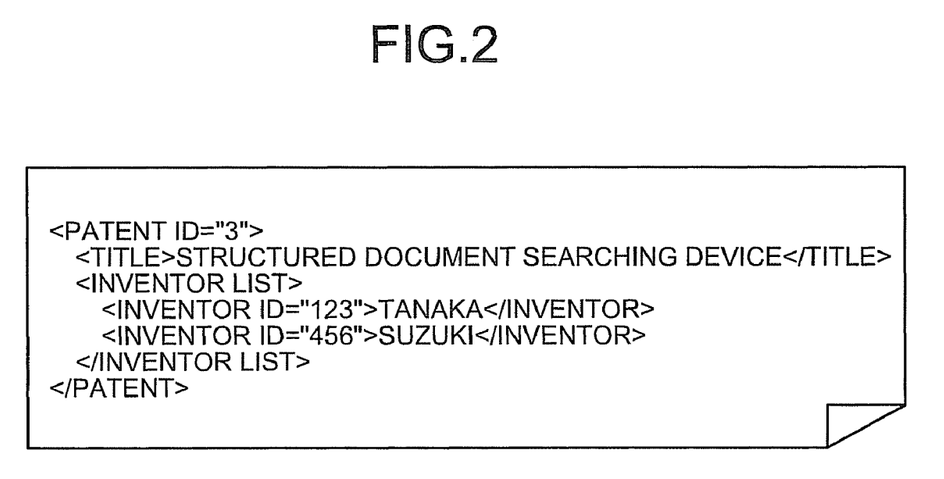
FIG. 2 is a view illustrating an example of a structured document used in the embodiment.

As illustrated in FIG. 2, in this embodiment, the structured document is written in XML (Extensible Markup Language).

In XML, a tag is used to describe the document structure and the tag includes a start tag and an end tag. Each of elements of the document structure is sandwiched by the start tag and the end tag in order to describe separation of a character string in the document and to which element the character string belongs. The start tag encloses an element name by the symbols "<" and ">" and the end tag encloses the element name by the symbols "</" and ">". The start tag may have attribute information set therein.

The storage unit 50 is configured to store information used in search processing by the search processing unit 60 and storage processing by the storage processing unit 20; and processing results of the storage processing by the storage processing unit 20. This storage unit 50 may be a HDD (Hard Disk Drive), an optical disk, a memory card, a RAM (Random Access Memory) or another conventional storage medium. The storage unit 50 includes a schema storage unit 51, a structured document storage unit 52, an index list storage unit 53, an index storage unit 54, a first rule storage unit 55 and a second rule storage unit 56. These are described in detail later.

The storage processing unit 20 is configured to analyze the structured document received from the communication unit 10 and create index information used in referring to (searching) the structured document. The storage processing unit 20 includes a document analyzing unit 22, a schema processing unit 24, an adding unit 30, an index creating unit 32 and a compressing unit 34.

The document analyzing unit 22 is configured to analyze a text of the structured document received from the communication unit 10, develop the structured document in an object tree format such as DOM (Document Object Model) and extract text information from the structured document.

Figure 3:
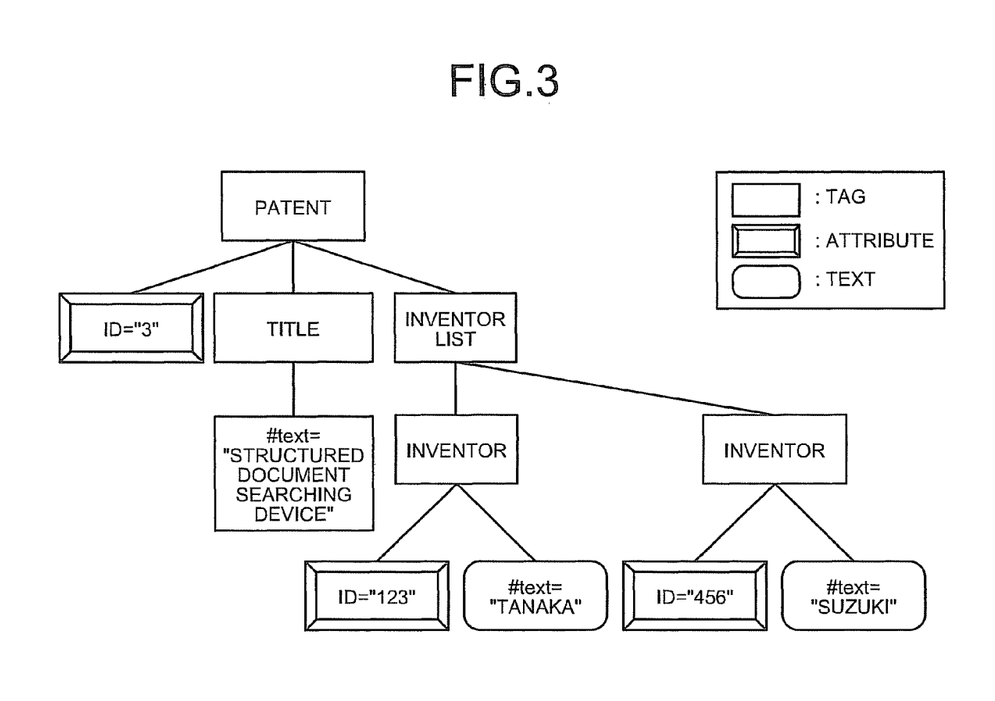
FIG. 3 is a view illustrating an example of the structured document developed in the object tree format.

FIG. 3 is a view illustrating an example of the object tree format, which is obtained by developing the structured document illustrated in FIG. 2. In the example illustrated in FIG. 3, an element starting with the tag "patent" are used as a document root, and elements starting with the tag "title" and the tag "inventor list" belong to the element starting with the tag "patent" as sub elements. To the element starting with the tag "inventor list", elements starting with the tag "inventor" belong as sub elements. The tag "patent" and the tag "inventor" have IDs set as attribute information, and the tag "title" and the tag "inventor" have character strings set therein.

The schema processing unit 24 is configured to create schema information that indicates structural characteristics of the structured document developed in the object tree format by the document analyzing unit 22 and determine schema identification information for identifying the created schema information. The schema processing unit 24 includes a schema creating unit 26 and a search unit 28.

The schema creating unit 26 is configured to scan the structured document developed in the object tree format by the document analyzing unit 22, consolidate overlapping elements of the same path, and create first schema information that indicates a structural characteristic of the structured document.

Figure 4:
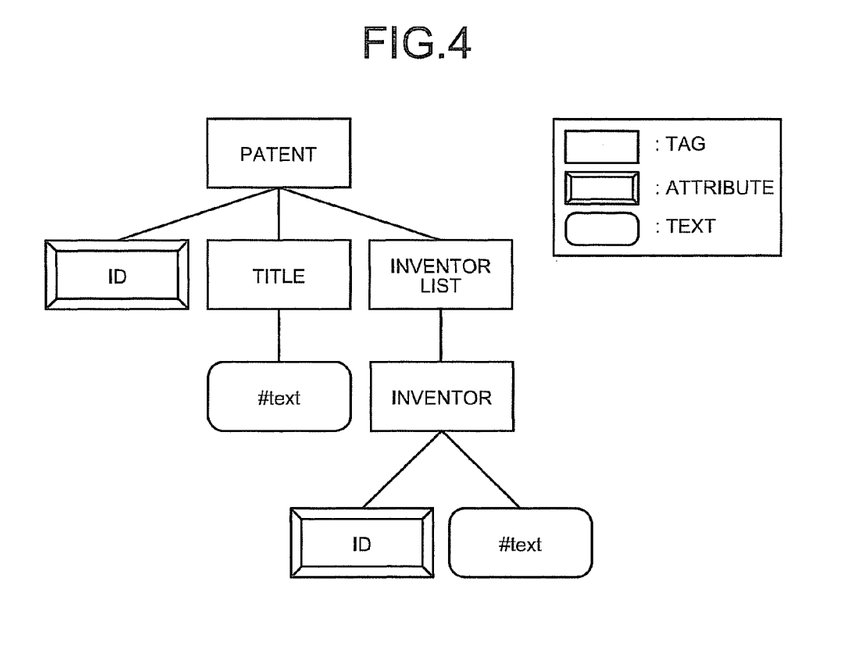
FIG. 4 is a view illustrating an example of first schema information created from the structured document.

As illustrated in an example of FIG. 4, the two "inventor" tags in the structured document illustrated in FIG. 3, which belong to the "inventor list" tag in an overlapped manner, are consolidated.

The schema storage unit 51 stores second schema information created in advance by the schema creating unit 26 and schema identification information for identifying the second schema information in association with each other.

Figure 5:
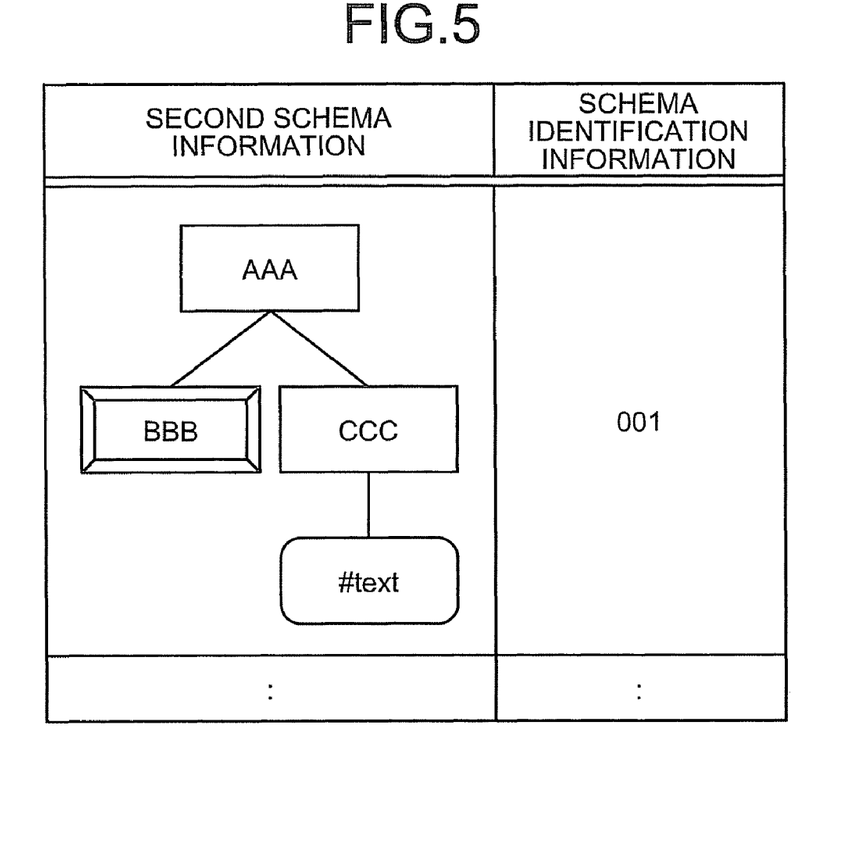
FIG. 5 is a view illustrating an example of information stored in a schema storage unit in the embodiment.

As illustrated in an example of FIG. 5, the second schema information has an element starting with the "AAA" tag used as a document root and a sub element starting with the "CCC" tag belonging thereto. The "AAA" tag has "BBB" set therein as attribute information and the "CCC" tag has a character string set therein. This second schema information is associated with the schema identification information "001".

The search unit 28 is configured to search the schema storage unit 51 for the second schema information that matches the first schema information created by the schema creating unit 26. Specifically, the search unit 28 searches whether elements (nodes in the respective object trees) of the both schema information match with each other. Then, the search unit 28 determines the schema identification information associated with the searched second schema information as the schema identification information of the first schema information created by the schema creating unit 26.

When a search results shows that the first schema information created by the schema creating unit 26 does not match any of the second schema information stored in the schema storage unit 51, the first schema information created by the schema creating unit 26 is associated with new schema identification information and the schema storage unit 51 is updated.

The adding unit 30 is configured to add the schema identification information associated with the second schema information searched by the search unit 28 and the identification information related to the structured document to the structured document developed in the object tree format by the document analyzing unit 22 and have the structured document stored in the structured document storage unit 52.

In this embodiment, the adding unit 30 adds, as the identification information related to the structured document, document identification information for uniquely identifying the structured document in the structured document management device 1 and element identification information for uniquely identifying the position of each element of the structured document in the structured document.

The index creating unit 32 is configured to create an index list by dividing the text information extracted by the document analyzing unit 22 into words and have the index list stored in the index list storage unit 53. Also, the index creating unit 32 creates for each divided word the index information, in which the schema identification information added to the structured document by the adding unit 30 and identification information are associated, and has the index information stored in the inverted file format in the index storage unit 54. Incidentally, the dividing into words may be performed by a conventional word dividing method such as N gram or morphological analysis.

In the present embodiment, the identification information associated with the index information includes, in addition to the document identification information and the element identification information given to the structured document by the adding unit 30, occurrence position information (offset) that indicates the position of the word occurring in the elements of the structured document.

Figure 6:
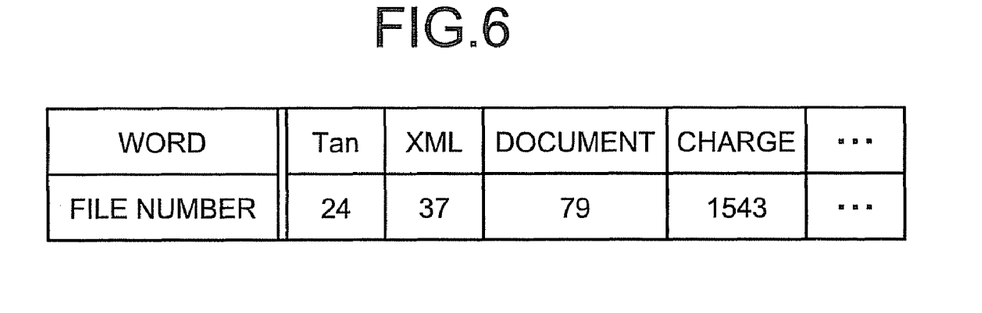
FIG. 6 is a view illustrating an example of information stored in an index list storage unit in the embodiment.

As illustrated in an example of FIG. 6, the words "Tan", "XML" and the like are stored associated with a file number of the inverted file. Accordingly, in this embodiment, when the search processing unit 60, as described later, performs searching with a designated word, it can access the corresponding inverted file only and the search speed is increased.

Figure 7:
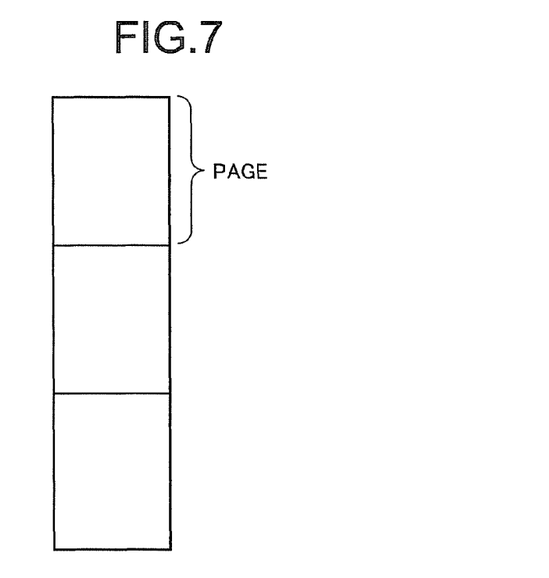
FIG. 7 is a view illustrating an inverted file used in the embodiment.

The inverted file has plural pages as illustrated in FIG. 7, and each of the pages has plural pieces of index information stored therein. In order to perform index search, scanning is started with the top of the inverted file to gather candidates. In this embodiment, the page size of the inverted file is set to a fixed length size which allows efficient processing by a disk I/O.

Figure 8:
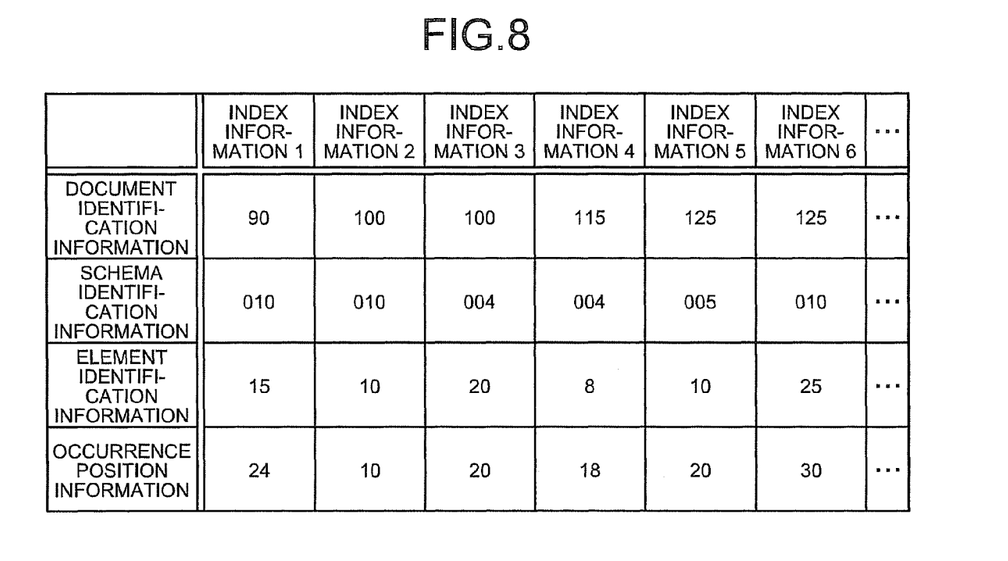
FIG. 8 is a view illustrating an example of index information stored in the inverted file format in an index storage unit in the embodiment.

As illustrated in FIG. 8, each index information piece includes the document identification information, the schema identification information, the element identification information and the occurrence position information. The index information further includes header information (not shown) in addition to the listed identification information.

The first rule storage unit 55 is configured to store the schema identification information, group identification information provided for uniquely identifying a group to which the schema identification information belongs and used in compression of the schema identification information group, and in-group identification information provided for uniquely identifying the schema identification information in the group and used in compression of the schema identification information group, in association with each other.

Figure 9:
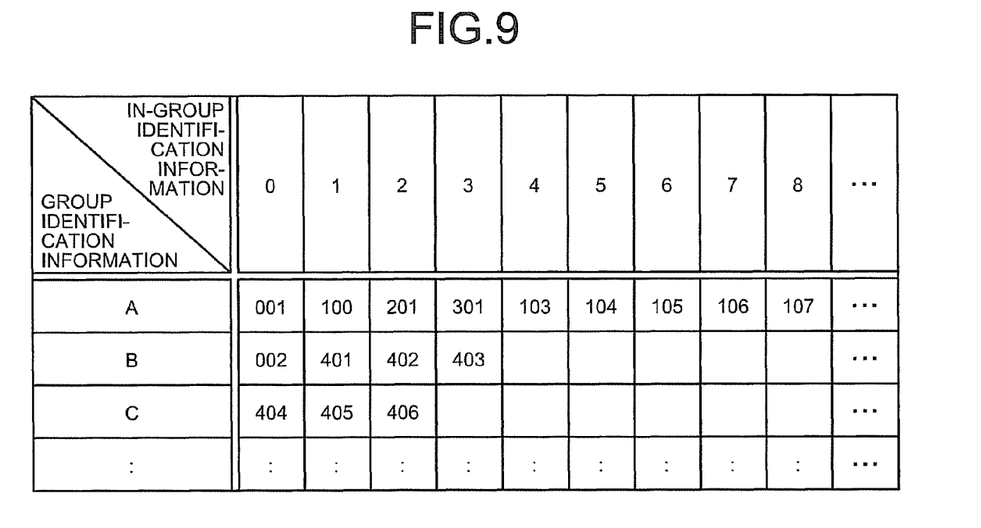
FIG. 9 is a view illustrating an example of information stored in a first rule storage unit in the embodiment.

As illustrated in an example of FIG. 9, values specified by the group identification information pieces and the in-group identification information may be the schema identification information. In the example illustrated in FIG. 9, a data amount of a combination of the group identification information and the in-group identification information is smaller than that of the schema identification information. Thus, the schema identification information can be replaced with the combination of the group identification information and the in-group identification information to make it compressible.

The group identification information associated with the schema identification information stored in the first rule storage unit 55 is determined in accordance with the number of searches within a predetermined time period for the schema identification information stored in the schema storage unit 51 by the search unit 28.

The second rule storage unit 56 stores a plurality of compression rules. As illustrated in an example of FIG. 10, various compression rules such as consolidation or unification of same values, replacement with a pattern, calculation of a difference and the like are defined together with their applicable conditions and application methods.

The compressing unit 34 is configured to, when a predetermined condition is met, compress the index information stored in the index storage unit 54 using the compression rule stored in the first rule storage unit 55 and the compression rule stored in the second rule storage unit 56. The compressing unit 34 includes an index analyzing unit 36, a first compressing unit 38, a second compressing unit 40 and a change unit 42.

The index analyzing unit 36 is configured to, when the number of index information pieces stored in the index storage unit 54 in the inverted file format excesses a threshold, analyze each distribution of the schema identification information group including a mentioned-number of schema identification information pieces and the identification information group including a mentioned-number of identification information pieces (document identification information group, element identification information group and occurrence position information group). In this embodiment, the number of index information pieces covering one page of the inverted file is set to the threshold.

Specifically, the index analyzing unit 36 determines whether the compression rule stored in the first rule storage unit 55 can be used to compress the schema identification information group. In this embodiment, when the distribution analysis result of the schema identification information group shows more than a predetermined number of schema identification information pieces match the schema identification information stored in the first rule storage unit 55, the index analyzing unit 36 determines that compression can be made.

Similarly, the index analyzing unit 36 determines whether the plural compression rules stored in the second rule storage unit 56 can be used to compress the schema identification information group, the document identification information group, the element identification information group and the occurrence position information group. In this embodiment, the index analyzing unit 36 basically performs an inspection whether each of the compression rules is applicable, starting with the top of the compression rules.

The first compressing unit 38 is configured to, when the distribution analysis result of the schema identification information group by the index analyzing unit 36 shows that more than a predetermined number of schema identification pieces match the schema identification information stored in the first rule storage unit 55, compress the schema identification information group using the group identification information and the in-group identification information.

Figure 11A:
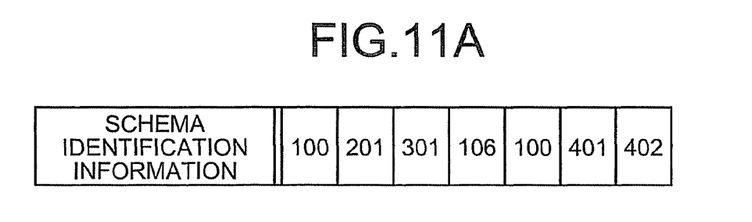
FIG. 11A is a view illustrating an example of a schema identification information group not yet compressed by a first compressing unit in the embodiment.
Figure 11B:
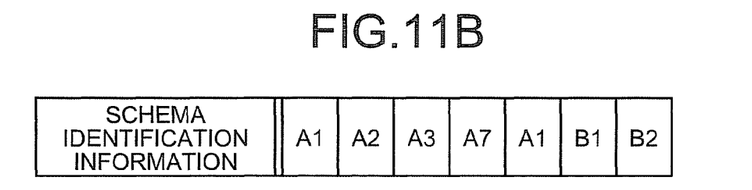
FIG. 11B is a view illustrating an example of a schema identification information group compressed by the first compressing unit.

As illustrated in examples of FIGS. 11A and 11B, the compression rule illustrate in FIG. 9 is used to perform compression of the schema identification information group. In the examples of FIGS. 11A and 11B, every schema identification information pieces of the schema identification information group match the schema identification information stored in the first rule storage unit 55, and the index analyzing unit 36 has determined that the compression can be made.

The second compressing unit 40 is configured to compress at least one of the schema identification information group and the identification information group (document identification information group, element identification information group and occurrence position information group) using the compression rule stored in the second rule storage unit 56 and obtained in accordance with the distribution analysis result of the index information by the index analyzing unit 36.

Figure 10:
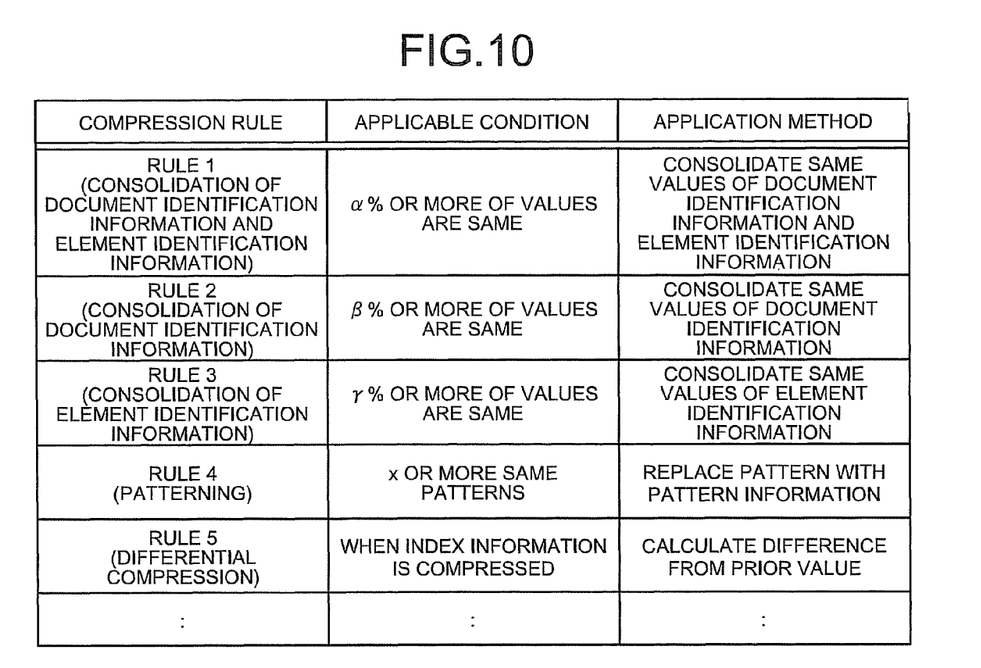
FIG. 10 is a view illustrating an example of information stored in a second rule storage unit in the embodiment.
Figure 12A:
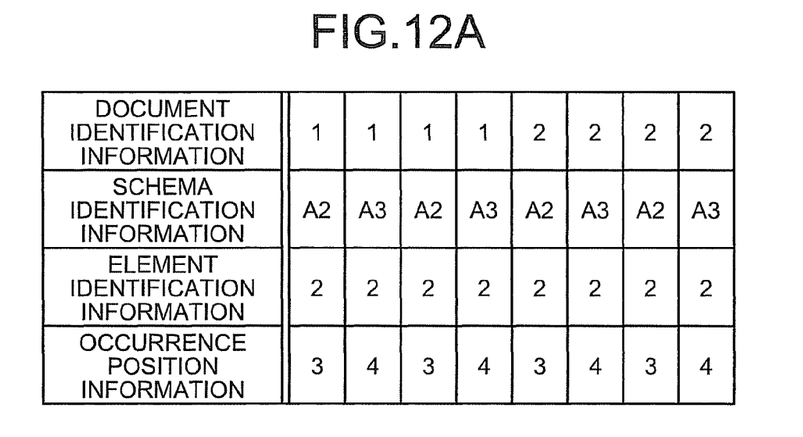
FIG. 12A is a view illustrating an example of an identification information group not yet compressed by a second compressing unit in the embodiment.
Figure 12B:
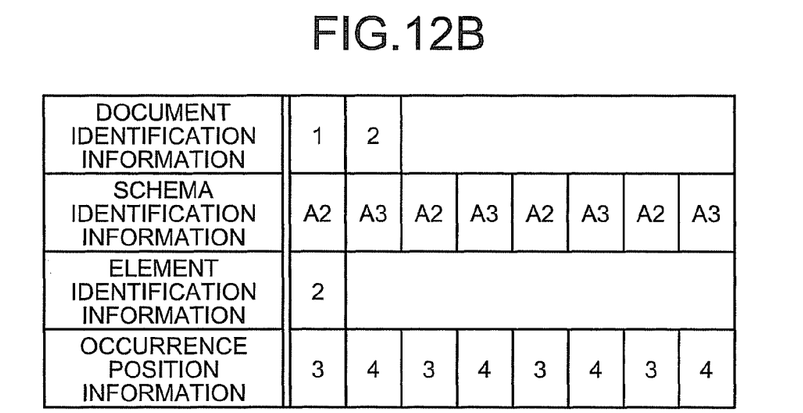
FIG. 12B is a view illustrating an example of an identification information group compressed by the second compressing unit.

In examples of FIGS. 12A and 12B, a compression rule 1 illustrated in FIG. 10 is used to perform compression.

The second compressing unit 40 is configured to, when there is a plurality of compression rules in accordance with the distribution analysis results of the index information, compress at least one of the schema identification information group and the identification information group using the plural compression rules. In this case, the compression rules are applied in an order of ranking.

The change unit 42 is configured to rearrange the index information compressed by the first compressing unit 38 and the second compressing unit 40 for each of the schema identification information and identification information (document identification information group, element identification information group and occurrence position information group) and store them in the index storage unit 54.

Figure 13A:
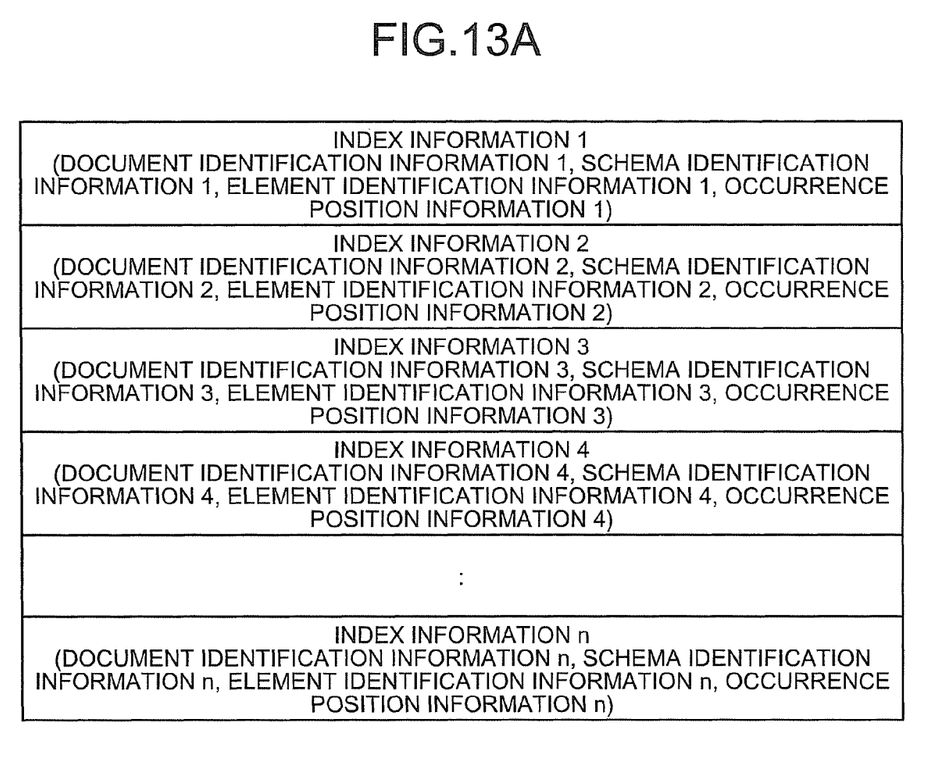
FIG. 13A is a view illustrating an example of index information not yet rearranged by a change unit in the embodiment.
Figure 13B:
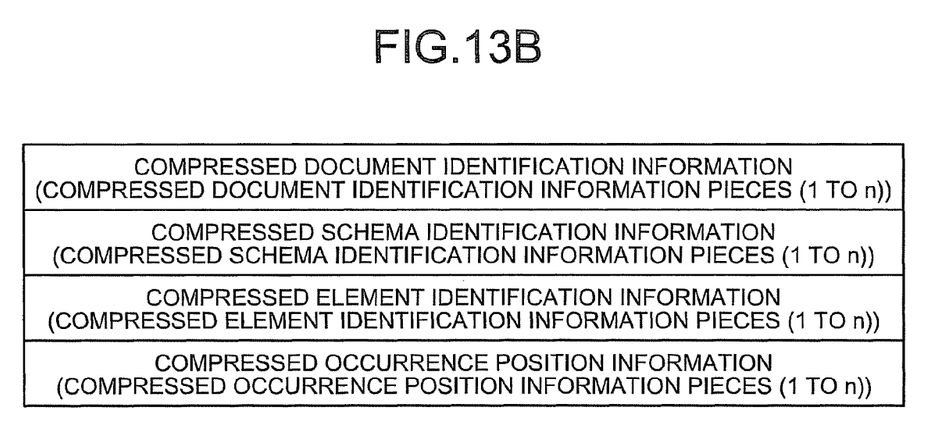
FIG. 13B is a view illustrating an example of index information rearranged by the change unit.

In examples of FIGS. 13A and 13B, the index information not yet rearranged is arranged for each index information piece, whereas the index information rearranged is arranged for each schema identification information, document identification information group, element identification information group and occurrence position information group.

In addition, the change unit 42 is configured to store the applied compression rule as the header information of the index information in rearrangement. This makes it possible to recover the index information and to handle a specific information group in searching by the later-described search processing unit 60.

The search processing unit 60 is configured to search the structured document managed in the structured document management device 1. Specifically, the search processing unit 60 decodes the index information with reference to the header information of the index information stored in the index storage unit 54 and uses the decoded index information to search for the structured document stored in the structured document storage unit 52. The search processing unit 60 may be configured to retrieve only a specified information group from the index information to increase the index scanning speed.

Next, a description is made about the operation of the structured document management device according to the present embodiment.

Figure 14:
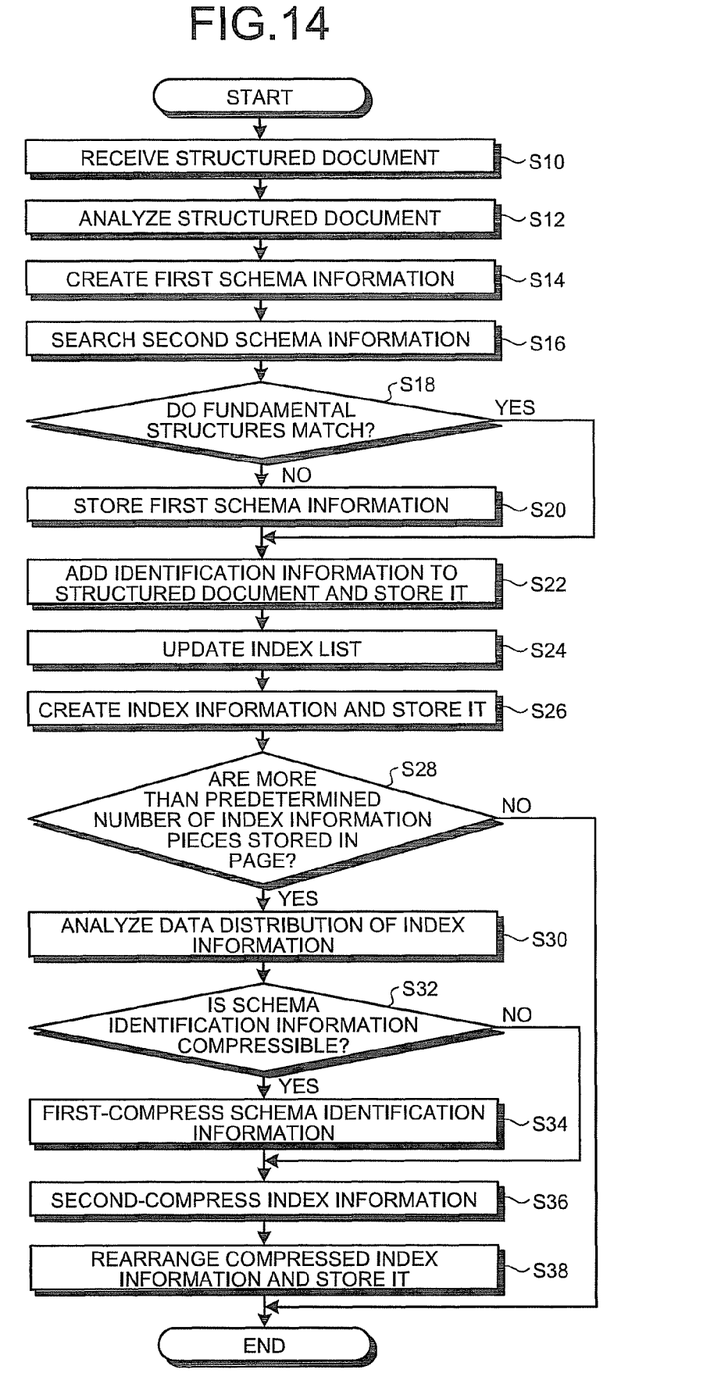
FIG. 14 is a flowchart illustrating an example flow of a creation processing procedure of index information of the structured document performed in the structured document management device.

As illustrated in FIG. 14, first, the communication unit 10 receives a structured document sent from the client device 2 (Step S10).

Then, the document analyzing unit 22 analyzes the syntax of the structured document received from the communication unit 10, develops the structured document into the object tree format such as DOM and extracts text information from the structured document (Step S12).

Next, the schema creating unit 26 scans the structured document developed into the object tree format by the document analyzing unit 22, consolidates overlapping elements in the same path and creates the first schema information that indicates a structural characteristic of the structured document (Step S14).

Then, the search unit 28 searches the schema storage unit 51 for the second schema information that matches the first schema information created by the schema creating unit 26 (Step S16).

When a search result shows that fundamental structures (elements) of both of the schema information match (Yes at Step S18), the search unit 28 determines the schema identification information associated with the searched second schema information as the schema identification information of the first schema information created by the schema creating unit 26.

When the search result shows that fundamental structures (elements) of both of the schema information does not match (No at Step S18), the search unit 28 associates a new schema identification information with the first schema information created by the schema creating unit 26 and stores the schema identification information in the schema storage unit 51 (Step S20).

Then, the adding unit 30 adds, to the structured document developed in the object tree format by the document analyzing unit 22, the schema identification information associated with the second schema information searched by the search unit 28 and the identification information relating to the structured document and stores the structured document in the structured document storage unit 52 (Step S22).

Next, the index creating unit 32 creates the index list by dividing the text information extracted by the document analyzing unit 22 into words and stores (updates) the index list in the index list storage unit 53 (Step S24).

Then, the index creating unit 32 creates, for each divided word, the index information associated with the schema identification information and the identification information added to the structured document by the adding unit 30 and stores the index information in the index storage unit 54 in the inverted file format (Step S26).

Next, the index analyzing unit 36 determines whether the number of index information pieces stored in the inverted file format in the index storage unit 54 exceeds a threshold (Step S28).

When the number of index information pieces exceeds the threshold (Yes at Step S28), the index analyzing unit 36 analyzes the distribution of each the an identification information group including the identification information pieces equal in number to the index information pieces and the schema identification information group including the schema identification information pieces equal in number to the index information pieces (Step S30).

When the number of index information pieces does not exceed the threshold (No at Step S28), Step S30 and its following steps are not performed and the processing ends.

Next, when a result of the distribution analysis of the schema identification information group by the index analyzing unit 36 shows that more than a predetermined number of schema identification information pieces match the schema identification information pieces stored in the first rule storage unit 55 (Yes at Step S32), the first compressing unit 38 compresses the schema identification information group using the group identification information and the in-group identification information (Step S34).

When the result of the distribution analysis of the schema identification information group by the index analyzing unit 36 shows that more than a predetermined number of schema identification information pieces do not match the schema identification information pieces stored in the first rule storage unit 55 (No at Step S32), the first compressing unit 38 does not perform processing of Step S34.

Then, the second compressing unit 40 compresses at least one of the schema identification information group and the identification information group using the compression rule stored in the second rule storage unit 56 and corresponding to the result of the distribution analysis of the index information by the index analyzing unit 36 (Step S36).

Next, the change unit 42 rearranges the index information pieces compressed by the second compressing unit 40 and the first compressing unit 38 for the schema identification information and identification information group and stores them in the index storage unit 54 (Step S38).

Next, a description is made about a specific example of compression by the structured document management device according to the present embodiment.

Figure 15A:
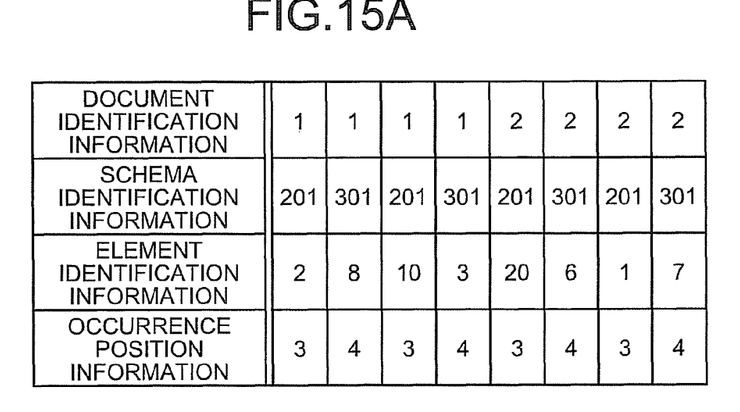
FIG. 15A is a view illustrating an example of index information not yet first-compressed.
Figure 15B:
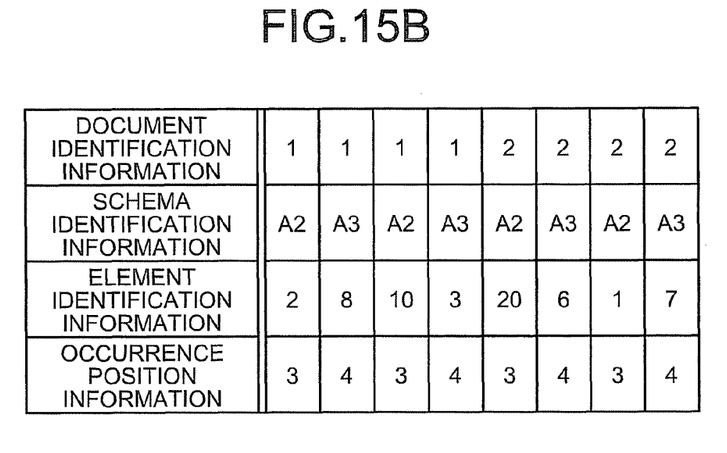
FIG. 15B is a view illustrating an example of index information not yet second-compressed using rule 2.
Figure 15C:
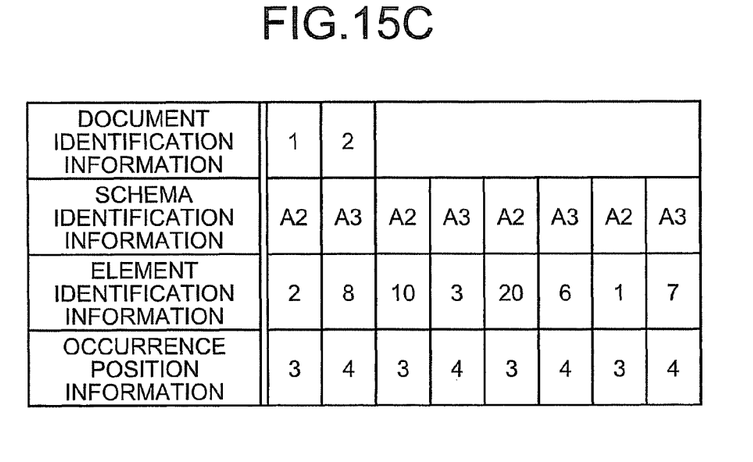
FIG. 15C is a view illustrating an example of index information second-compressed using the rule 2.

In an example illustrated in FIG. 15A, values "1" and "2" of the document identification information group appear successively, and values of the schema identification information group match those of the schema identification information stored in the first rule storage unit 55. Hence, in this case, the schema identification information group is compressed by the first compressing unit 38 (see FIG. 15B) and then, the document identification information group is compressed by the second compressing unit 40 using the compression rule 2 illustrated in FIG. 10 (see FIG. 15C).

Figure 16A:
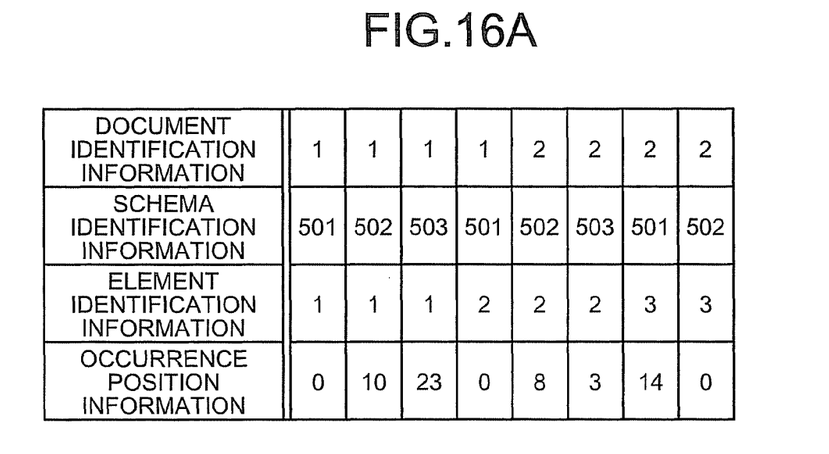
FIG. 16A is a view illustrating an example of index information not yet second-compressed using rule 1.
Figure 16B:
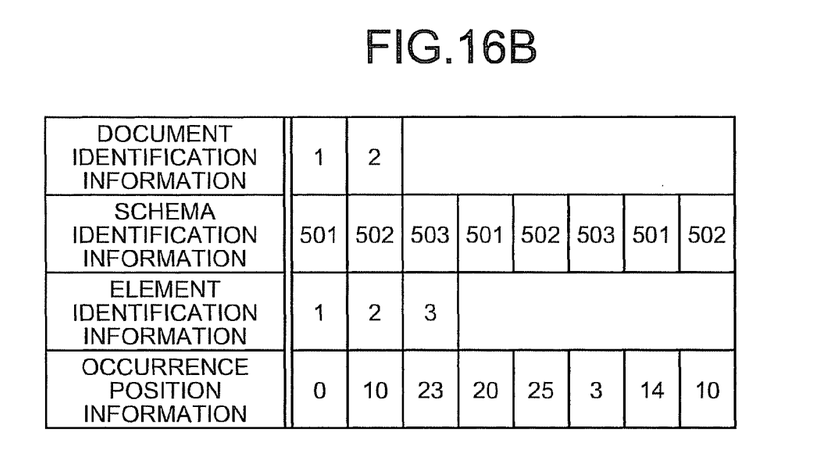
FIG. 16B is a view illustrating an example of index information second-compressed using the rule 1 but not yet second-compressed using rule 4.

In an example illustrated in FIG. 16A, values "1" and "2" of the document identification information group appear successively, and values "1", "2" and "3" of the element identification information group appear successively. Beside, values of the schema identification information group are "501", "502" and "503", only. Hence, in this case, the document identification information group is compressed by the second compressing unit 40 using the compression rule 1 illustrated in FIG. 10 (see FIG. 16B) and then, the document identification information is compressed by the second compressing unit 40 using the compression rule 4 illustrated in FIG. 10 (see FIG. 16C).

Figure 16C:
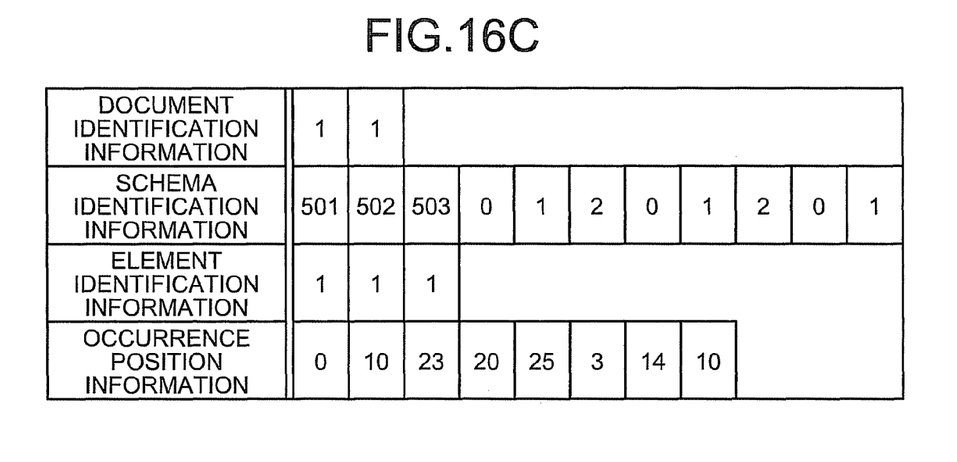
FIG. 16C is a view illustrating an example of index information second-compressed using the rule 4.

As illustrated in FIG. 16C, the compression using a pattern of the compression rule 4 illustrated in FIG. 10, "501", "502" and "503" are made "0", "1" and "2", respectively, and "501", "502" and "503" are put at the top as the heading.

Figure 17A:
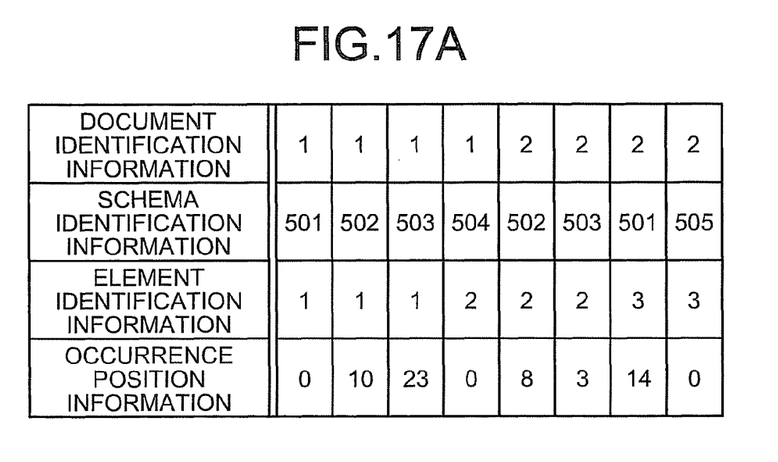
FIG. 17A is a view illustrating an example of index information not yet second-compressed using the rule 1.

In an example illustrated in FIG. 17A, values "1" and "2" of the document identification information group appear successively and values "1", "2" and "3" of the element identification information group appear successively. Hence, in this case, the document identification information group is first compressed by the second compressing unit 40 using the compression rule 1 illustrated in FIG. 10 (see FIG. 17B).

Figure 17B:
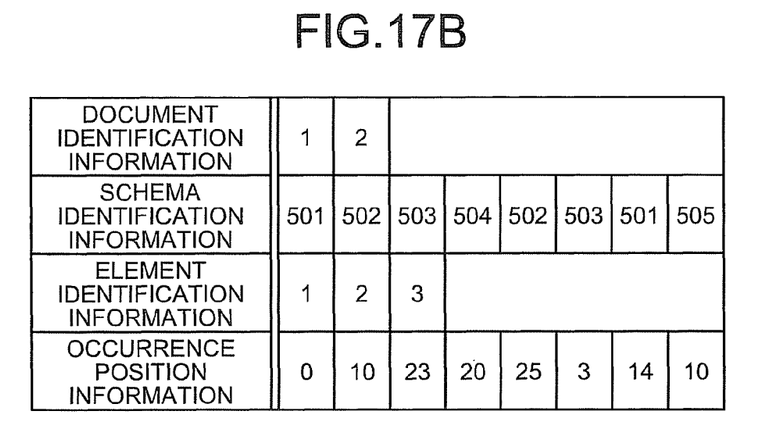
FIG. 17B is a view illustrating an example of index information second-compressed using the rule 1 but not yet second-compressed using rule 5.
Figure 17C:
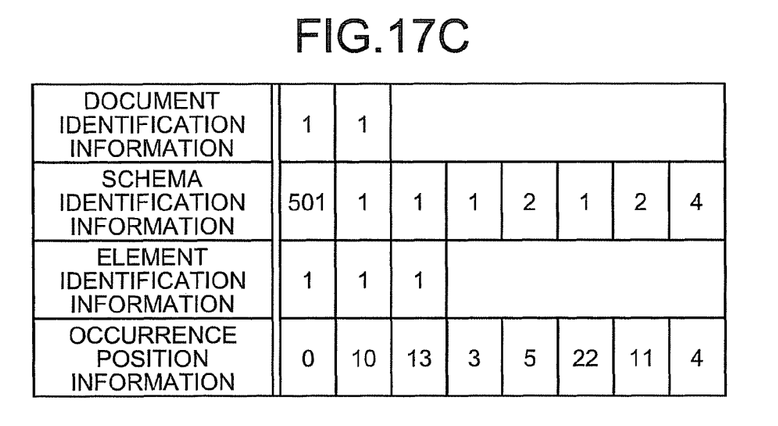
FIG. 17C is a view illustrating an example of index information second-compressed using the rule 5.

Furthermore, in an example illustrated in FIG. 17B, a great effect is expected when a differential compression is used and therefore, the document identification information group is then compressed by the second compressing unit 40 using the compression rule 5 illustrated in FIG. 10 (see FIG. 17C).

As described so far, according to this embodiment, the schema identification information, the group identification information capable of identifying a group to which the schema identification information belongs, and the in-group identification information capable of identifying the schema identification information in the group are stored in association with each other. Thus, the schema identification information group can be compressed using the group identification information and the in-group identification information, and even an index that includes the schema identification information as the structure information of the structured document can be compressed appropriately.

Furthermore, according to the present embodiment, not only the schema identification information group, but also the document identification information group, the element identification information group and the occurrence position information group are compressed using the compression rule corresponding to a result of distribution analysis of the index information, so that the index information can be compressed more effectively.

The structured document management device 1 and the client device 2 in the above-described embodiment have hardware configurations each having a controller such as a CPU (Central Processing Unit), a storage device such as a ROM (Read Only memory) and a RAM (Random Access Memory), a display device such as a liquid crystal display, an input device such as a keyboard and a mouse, a communication I/F for connecting to the network for communication and the like.

The present invention is not limited to the above-described embodiment and may be embodied in various forms by modifying any elements without departing from the scope of the invention. Furthermore, plural elements disclosed in the above-described embodiments are combined appropriately into various inventions. For example, any of all of the elements disclosed in the above-described embodiments may be removed. Also, elements of various embodiments may be combined appropriately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document management device comprising:
a communication unit that receives a structured document from a client device via a network;
a document analyzing unit that analyzes a structure of the structured document and extracts text information of the structured document;
a schema creating unit that creates first schema information that indicates a structural characteristic of the structured document;
a schema storage unit that stores second schema information created in advance by the schema creating unit and schema identification information for identifying the second schema information in association with each other;
a search unit that searches the schema storage unit for the second schema information that substantially matches the first schema information;
an adding unit that adds, to the structured document, the schema identification information for identifying the second schema information searched by the search unit and identification information for identifying the structured document;
an index creating unit that divides the text information into words and creates index information associated with the schema identification information and the identification information for each of the words;
an index storage unit that stores the index information in a file format;
an index analyzing unit that analyzes, in response to a determination that a number of pieces of the index information stored in the file format exceeds a threshold, a distribution of a schema identification information group that includes pieces of the schema identification information equal in number to the pieces of the index information and an identification information group that includes pieces of the identification information equal in number to the pieces of the index information;
a first rule storage unit that stores the schema identification information, group identification information provided for uniquely identifying a group to which the schema identification information belongs and used in compression of the schema identification information group, and in-group identification information provided for uniquely identifying the schema identification information in the group and used in compression of the schema identification information group, in association with each other;
a second rule storage unit that stores a plurality of compression rules;
a first compressing unit that compresses, in response to a result of distribution analysis of the schema identification information group illustrating that more than a predetermined number of pieces of the schema identification information match pieces of the schema identification information stored in the first rule storage unit, the schema identification information group using the group identification information and the in-group identification information; and
a second compressing unit that compresses at least one of the schema identification information group or the identification information group using a compression rule stored in the second rule storage unit and determined in accordance with a result of distribution analysis of the index information.

2. The device according to claim 1, wherein the search unit determines the group identification information associated with the schema identification information stored in the first rule storage unit in accordance with a number of searches performed within a predetermined time period for the schema identification information stored in the schema storage unit.

3. The device according to claim 1, further comprising a change unit that rearranges the index information compressed by the first compressing unit and the second compressing unit for the schema identification information and the identification information and stores the index information in the index storage unit.

4. The device according to claim 1, wherein, in response to a determination that there are a plurality of the compression rules determined in accordance with the result of distribution analysis of the index information, the second compressing unit uses the plurality of the compression rules to compress at least one of the schema identification information group or the identification information group.

5. A structured document management method comprising:
receiving a structured document from a client device via a network;
analyzing a structure of the structured document and extracting text information of the structured document;
creating first schema information that indicates a structural characteristic of the structured document;
searching a schema storage unit that stores second schema information created in advance and schema identification information for identifying the second schema information in association with each other for the second schema information that substantially matches the first schema information;

adding, to the structured document, the schema identification information for identifying the searched second schema information and identification information for identifying the structured document;

dividing the text information into words;

creating index information associated with the schema identification information and the identification information for each of the words;

storing the index information in a file format in the index storage unit;

analyzing, in response to determining that a number of pieces of the index information stored in the file format exceeds a threshold, a distribution of a schema identification information group that includes pieces of the schema identification information equal in number to the pieces of the index information and an identification information group that includes pieces of the identification information equal in number to the pieces of the index information;

compressing, in response to determining that a result of distribution analysis of the schema identification information group illustrates that more than a predetermined number of pieces of the schema identification information match pieces of the schema identification information stored in a first rule storage unit having the schema identification information, group identification information provided for uniquely identifying a group to which the schema identification information belongs and used in compression of the schema identification information group, and in-group identification information provided for uniquely identifying the schema identification information in the group and used in compression of the schema identification information group stored in association with each other, the schema identification information group using the group identification information and the in-group identification information; and compressing at least one of the schema identification information group or the identification information group using a compression rule stored in a second rule storage unit that stores a plurality of compression rules and determined in accordance with a result of distribution analysis of the index information.

* * * * *